United States Patent
Liu et al.

(10) Patent No.: US 9,661,298 B2
(45) Date of Patent: May 23, 2017

(54) DEPTH IMAGE ENHANCEMENT FOR HARDWARE GENERATED DEPTH IMAGES

(71) Applicant: Intel Corporation, Santa Clara, CA (US)

(72) Inventors: Haowei Liu, Santa Clara, CA (US); Mohamed Selim Ben Himane, Santa Clara, CA (US); Leonid M. Keselman, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/820,069

(22) Filed: Aug. 6, 2015

(65) Prior Publication Data

US 2017/0041585 A1  Feb. 9, 2017

(51) Int. Cl.
*G06K 9/00* (2006.01)
*H04N 13/00* (2006.01)

(52) U.S. Cl.
CPC ............................ *H04N 13/0022* (2013.01)

(58) Field of Classification Search
CPC ............ H04N 13/0022; H04N 13/0018; G06T 2207/10012; G06T 2200/04
USPC .................................................. 382/154, 254
See application file for complete search history.

(56) References Cited

U.S. PATENT DOCUMENTS

| | | | | |
|---|---|---|---|---|
| 9,305,206 B2* | 4/2016 | Pegg | ................... | G06K 9/00221 |
| 2010/0080485 A1 | 4/2010 | Chen et al. | | |
| 2010/0195898 A1 | 8/2010 | Bang et al. | | |
| 2010/0208994 A1 | 8/2010 | Yao et al. | | |
| 2012/0113117 A1* | 5/2012 | Nakayama | ............ | G06T 7/0051 345/420 |
| 2014/0206443 A1* | 7/2014 | Sharp | ................... | G06T 7/0046 463/31 |
| 2015/0071526 A1 | 3/2015 | Nguyen et al. | | |
| 2015/0178900 A1* | 6/2015 | Kim | ........................ | G06T 5/50 382/154 |
| 2015/0235351 A1* | 8/2015 | Mirbach | ................. | G06T 5/002 382/154 |

FOREIGN PATENT DOCUMENTS

KR  20140038649  3/2014

OTHER PUBLICATIONS

Zabih et al., "Non-parametric Local Transforms for Computing Visual Correspondence", In Proceedings of European Conference on Computer Vision, Stockholm, Sweden, May 1994, pp. 151-158 (8 pages).

(Continued)

*Primary Examiner* — Daniel Mariam
(74) *Attorney, Agent, or Firm* — Green, Howard & Mughal LLP

(57) ABSTRACT

Techniques related to depth image enhancement for hardware generated depth images are discussed. Such techniques may include determining a depth image enhancement indicator for a depth image based on the depth image and a depth image model and generating pixel depth values for missing pixel depth values of the depth image when the depth image enhancement indicator indicates enhancement. The pixel depth values may be generated based on search windows that extend from a position greater than a predetermined disparity position to a maximum disparity position.

25 Claims, 7 Drawing Sheets

(56) References Cited

OTHER PUBLICATIONS

Viola et al., "Robust Real-time Object Detection", 2nd International Workshop on Statitstical and Computational Theories of Vision—Modeling, Learning, Computing, and Sampling Vancouver, Canada, Jul. 13, 2001, 25 pages.

International Search Report and Written Opinion of the International Searching Authority for PCT Application No. PCT/US2016/040995, mailed on Oct. 7, 2016.

* cited by examiner

DEPTH IMAGE ENHANCEMENT FOR HARDWARE GENERATED DEPTH IMAGES

BACKGROUND

In computer vision and other imaging and computing contexts, depth images may be generated based on two (e.g., left and right or reference and target) two-dimensional images of a scene. For example, active stereo cameras may generate such depth images based on infrared (IR) images attained based on a projection of IR light onto the scene. Such depth images may be used in a wide variety of contexts such as object detection, object tracking, gesture recognition and device control based on such gestures, facial pose recognition and device control based on such facial gestures, three-dimensional scene reconstruction, scene understanding, virtual reality, augmented reality, and the like.

Furthermore, it may be desirable to generate such depth images in real time at high frame rates. In some contexts the generation of depth images may be implemented via hardware. Such hardware implementations may have limitations such as limited disparity value search ranges or the like that may degrade the quality of the depth image by leaving many pixels without depth values, for example.

It may be advantageous to generate high quality depth images in real time. It is with respect to these and other considerations that the present improvements have been needed. Such improvements may become critical as the desire to utilize such depth images in a variety of applications becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
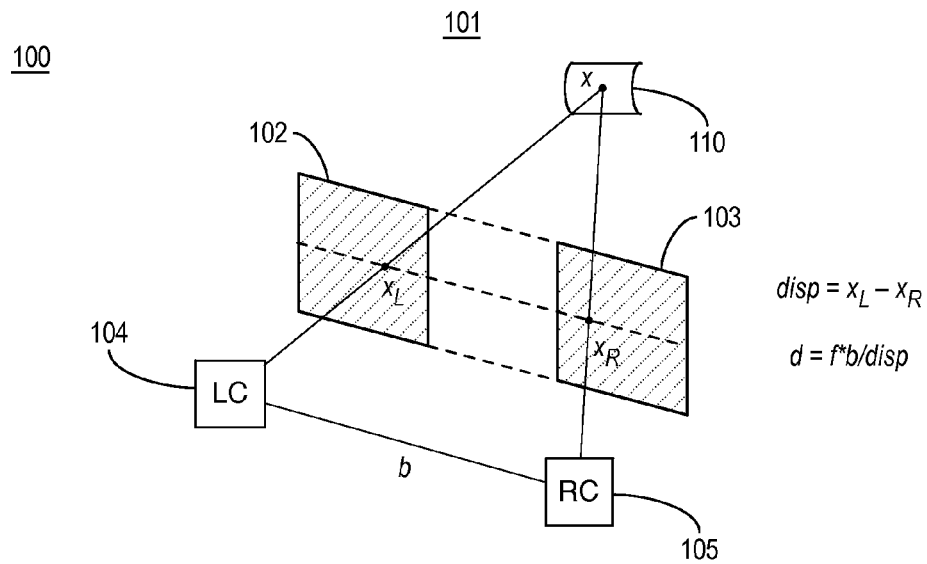
FIG. 1 illustrates an example stereoscopic image matching.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or such embodiments, or examples, etc., indicate that the implementation, embodiment, or example described may include a particular feature, structure, or characteristic, but every implementation, embodiment, or example may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to affect such feature, structure, or characteristic in connection with other implementations whether or not explicitly described herein.

Methods, devices, apparatuses, computing platforms, and articles are described herein related to enhancing hardware generated depth images.

As described above, in some contexts, depth images may be generated via hardware such as a graphics processor, dedicated image processing hardware, or the like. Such hardware implementations may have limitations such as limited disparity value search ranges or the like that may degrade the quality of the depth image by leaving pixels without depth values. Such missing pixel depth values may cause difficulties in applications that utilize the depth images.

In some embodiments discussed herein, a depth image associated with a scene may be received or generated. For example, the depth image may be generated based on stereoscopy techniques applied to infrared images via hardware and the depth image may include missing pixel depth values. Furthermore, a depth image model of the scene may be generated. The depth image model may include depth image data and may be generated based on a sequence of previous depth images and/or other data. For example, the sequence of previous depth images may include multiple depth images up to and including a depth image previous to the current depth image. Based on such previous depth images, a model of the scene (e.g., a scene model such as a three-dimensional model) may be generated and updated as new depth images are available. For a particular depth image such as a depth image previous to the current depth image, a camera pose may be determined and the depth image model may be generated based on the camera pose and the scene model. For example, the depth image model may be rendered based on the camera pose and the scene model.

Based on the depth image and the depth image model of the scene, a depth image enhancement indicator indicating whether the depth image is to be enhanced or not may be determined. The depth image enhancement indicator may be based on a difference between a fill rate of the depth image and a fill rate of the depth image model of the scene, determining a surface of the depth image model is less than a depth threshold from an estimated camera position, comparing a fill rate of the depth image to a fill rate threshold, a combination thereof, or the like. In cases where the depth image enhancement indicator indicates no enhancement, the depth image may not be enhanced (e.g., enhancement may be skipped).

In cases where the depth image enhancement indicator indicates enhancement, the depth image may be enhanced by generating pixel depth values for missing pixel depth values of the depth image. As discussed, the depth image may have missing pixel depth values due to a hardware limited disparity value search range or the like. The pixel depth values may be generated by, for individual pixels having missing depth values, generating a window around a pixel position of the individual pixel in a reference image and searching for a best match window from a plurality of search windows within a target image such that the search windows extend only from a first search window positioned greater than a predetermined disparity position from a collocated window in the target image to a last search window at a maximum disparity position from the collocated window. For example, the first search window may be beyond the limited disparity value search ranges and the last search window may complete a search within the target image.

Such techniques may overcome hardware depth limitations via a combined hardware and software implementation to perform high quality stereoscopic imaging. Furthermore, the enhanced depth images discussed herein may provide high quality depth images in real time at high frame rates. Such enhanced depth images may be used in a variety of applications such as object detection, object tracking, gesture recognition and device control based on such gestures, facial pose recognition and device control based on such facial gestures, three-dimensional scene reconstruction, scene understanding, virtual reality, augmented reality, perceptual computing, volumetric reconstruction, or the like.

In contrast to prior techniques such as in-painting and/or using filters (e.g., bilateral filters or the like) to estimate missing pixel depth values, the techniques discussed herein may use raw reference and target images to perform stereo matching, which may provide higher quality pixel depth values for the missing pixel depth values. For example, such in-painting and/or filtering techniques may provide bleeding artifacts, interpolate based on incorrect surfaces, generate incorrect depth values or the like, which may be avoided using the techniques discussed herein. Furthermore, the discussed techniques may provide depth images and/or enhanced depth images in real time at high frame rates. Such real time processing may be attained via implementation of the depth image enhancement indicator, generating depth values only for missing pixel depth values (e.g., only for needed locations and not the entire image), evaluating search windows using an integral image data structure, or a combination thereof. Such techniques may provide for efficient and high quality depth images that may compensate for image sensor failures, limitations of the hardware target image searching, and the like.

FIG. 1 illustrates an example stereoscopic image matching 100, arranged in accordance with at least some implementations of the present disclosure. As shown in FIG. 1, stereoscopic image matching 100 may include attaining a pair of rectified images 102, 103 of a scene 101 including a surface 110. As shown, rectified images 102, 103 may include a left or reference image 102 and a right or target image 103 attained via a left camera 104 and a right camera 105, respectively. As illustrated, in some examples, the left image may be the reference image and the right image may be the target image. In other examples, the right image may be the reference image and the left image may be the target image and/or additional target images may be used. Furthermore, scene 101 may include any suitable scene including indoor or outdoor scenes, scenes including objects and/or people, and so on. Pair of rectified images 102, 103 may include any suitable images, image data, or the like. In some examples, pair of rectified images 102, 103 may be color images. In other examples, pair of rectified images 102, 103 may be infrared images. Furthermore, in some examples, left camera 104 and right camera 105 may be implemented via a stereo camera or the like. As used herein, the term image may refer to any suitable image, image data, or the like that may represent a scene.

Stereo matching techniques such as those discussed herein may determine a depth image based on triangulating correspondences. For example, as shown in FIG. 1, given a pair of rectified images 102, 103, each including a representation of three-dimensional point x on surface 110, the depth, d, of x, may be determined based on d=f*b/disp, where f and b are the focal length and base line, respectively, and disp, is the disparity for x, indicating the pixel displacement of x between rectified images 102, 103 (e.g., $x_L$-$x_R$, where $x_L$ and $x_R$ are the projections of x onto rectified images 102, 103, respectively). To determine the disparity, a rectangular template or window may be formed around $x_L$ on the left or reference image (e.g., rectified image 102) and search windows in the right or target image (e.g., rectified image 103) may be searched for the best match. For example, the rectangular template or window may be placed on rectified image 103 at p pixels away from $x_L$ (e.g., where p=0 is associated with a collocated pixel position and window in rectified image 103) and a determination may be made as to which p provides a best match in terms of a metric such as a sum such as squared differences (SSD) or the like. In some examples, the metric such as SSD score may be the best match (e.g., minimum among the search windows) and less than a predefined threshold (e.g., such that large SSD scores associated with no match are not used to generate a false depth value). For example, an SSD threshold of 512 may be applied for a 7 by 9 rectangular template or window (e.g., 7 vertical pixels by 9 horizontal pixels). The value of p that provides the best match and is less than the threshold may be the disparity of x.

Such a process may be repeated for all or some pixels of rectified images 102, 103 to generate disparity values for the associated pixel locations. Such disparity values may be translated to depth values as discussed above (e.g., such that d=f*b/disp) and the resultant depth image may include depth values for such pixels.

Figure 2:
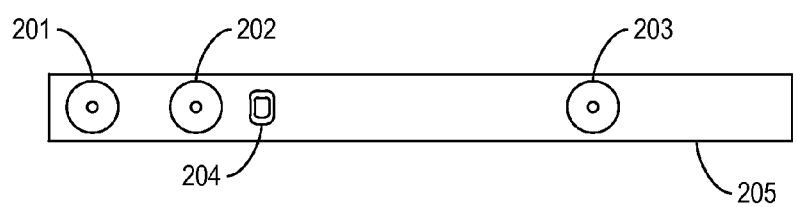
FIG. 2 illustrates an example device for generating depth images.

FIG. 2 illustrates an example device 200 for generating depth images, arranged in accordance with at least some implementations of the present disclosure. As shown in FIG. 2, device 200 may include an infrared (IR) camera 201, a color (e.g., RGB) camera 202, an infrared (IR) camera 203, and an infrared (IR) transmitter 204 implemented within a housing 205. For example, infrared transmitter 204 may illuminate a scene with infrared light and infrared cameras 201, 203 may attain stereo infrared images (e.g., left/right, reference/target, or the like) images based on the scene and the illumination provided via infrared transmitter 204. In some examples, infrared transmitter 204 may provide infrared illumination having a predetermined pattern or the like.

In some examples, device 200 may include a stereo matching module (not shown) implemented via hardware (e.g., a graphics processor, an image processor, or the like) to generate a depth image based on the attained stereo infrared images. As shown, in some examples, depth images may be generated based on infrared images or image data. In other examples, depth images may be generated based on color images (e.g., RGB images or image data) or any other suitable images or image data. As discussed with respect to FIG. 2, such a stereo matching module may generate a depth image based on a search of a target image based on a window generated around a pixel location in a reference image. In some examples, a limitation such as a predetermined disparity position, a hardware based maximum disparity position, or the like may be implemented via the hardware based stereo matching module. Such a limitation may provide a maximum hardware based disparity value that will be searched. For example, the stereo matching module implemented via hardware may search from a value of p=0 to a value of p=MaxDisp such that MaxDisp is a parameter set via hardware as an upper bound to limit searching. Such a limitation may save in computational cost, hardware cost, or the like. The predetermined disparity position, a hardware based maximum disparity position, or the like may be any suitable value such as 20 pixels, 30 pixels, 50, pixels, 64 pixels, or the like.

Figure 3:
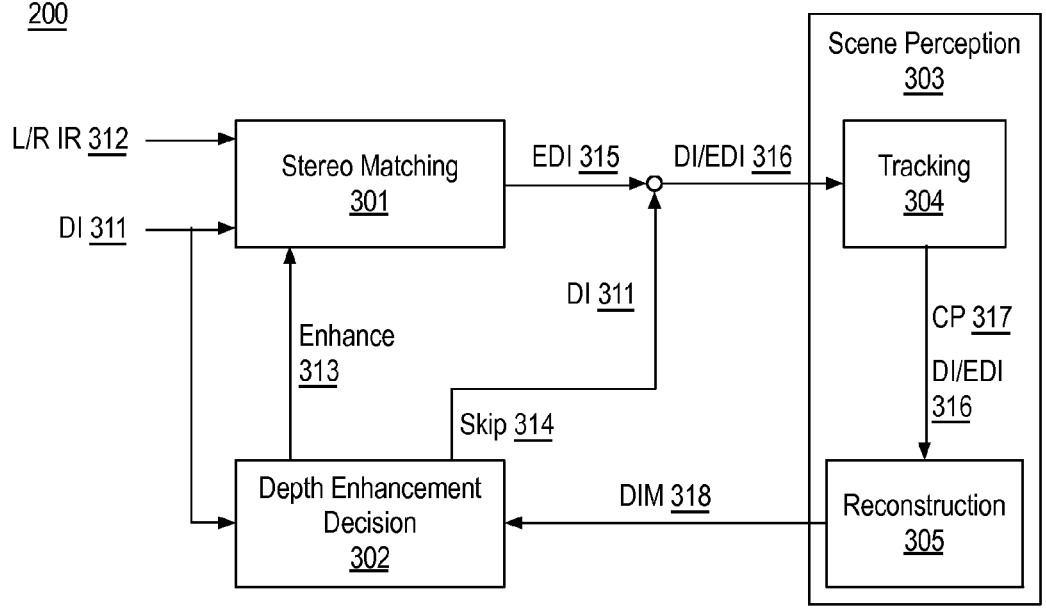
FIG. 3 illustrates example components of a device for generating enhanced depth images.

FIG. 3 illustrates example components of device 200 for generating enhanced depth images, arranged in accordance with at least some implementations of the present disclosure. As shown in FIG. 3, device 200 may include a stereo matching module, a depth enhancement decision module 302, and a scene perception module 303 that may include a tracking module 304 and a reconstruction module 305. As shown, stereo matching module 301 may receive left and right (L/R) infrared (IR) images 312 and a depth image 311, and depth enhancement decision module 302 may receive depth image 311. Left and right infrared images 312 may include any suitable images for generating a depth image such as reference and target infrared images, or the like. Although illustrated with respect to infrared images, stereo matching module 301 may perform the techniques discussed herein based on any two or more stereoscopic images such as left/right or reference/target color images, or the like. Left and right infrared images 312 may be received from any suitable component or module of device 200 such as infrared cameras 201, 203, a memory of device 200, or the like. In some examples, left and right infrared images 312 and depth image 311 may be received as sequences of images at a frame rate.

Furthermore, depth image 311 may include any suitable depth image such as a depth image having some missing pixel depth values (e.g., pixel locations with no associated depth values). In some examples, such missing pixel depth values may have a value of zero in depth image 311. For example, a pixel depth value of zero may indicate no depth value was determined for the associated pixel location. Depth image 311 may received from any suitable component or module of device 200 such as a stereo matching module implemented via hardware (e.g. a graphics processor, an image processor) or a memory of device 200, or the like.

As discussed, depth enhancement decision module 302 may receive depth image 311 from a stereo matching module implemented via hardware (e.g. a graphics processor, an image processor) or a memory of device 200, or the like. Also, as shown, depth enhancement decision module 302 may receive a depth image model 318 from scene perception module 303. Depth image model 318 may include any suitable data such as depth image data or the like. In some examples, depth image model 318 may be generated based on scene model constructed based on a sequence of depth images and/or other data. For example, such sequences of depth images may include prior depth images up to and including a depth image previous to depth image 311.

Scene perception module 303 may generate depth image model 318 using any suitable technique or techniques. In some examples, scene perception module 303 may be implemented as or considered middleware to evaluate high level scene information and provide information for low level depth enhancement components or modules such as depth enhancement decision module 302 and/or stereo matching module 301. For example, as shown, tracking module 304 of scene perception module 303 may receive either a depth image or an enhanced depth image (DI/EDI) 316. For example, depth image/enhanced depth image 316 may be associated with a depth image prior to the current depth image 311. For example, if the prior depth image was enhanced, depth image/enhanced depth image 316 may include a prior enhanced depth image and, if the prior depth image was not enhanced, depth image/enhanced depth image 316 may include a prior depth image (e.g., an unenhanced prior depth image).

Tracking module 304 may receive depth image/enhanced depth image 316 and tracking module 304 may generate a camera pose (CP) 317 based on depth image/enhanced depth image 316 and/or previous camera poses or models of the current scene. Camera pose 317 may include any suitable data or information representative of a determined camera pose within a scene such as camera position and camera orientation. Camera pose 317 may be generated using any suitable technique or techniques. For example, tracking module 304 may generate camera pose 317 based on depth image/enhanced depth image 316 and/or a model of the scene.

Reconstruction module 305 may receive camera pose 317 and depth image/enhanced depth image 316 and reconstruction module 305 may generate depth image model 318.

Depth image model 318 may include any suitable model and/or data representing a scene such as depth image data or the like. Reconstruction module 305 may generate depth image model 318 using any suitable technique or techniques. For example, reconstruction module 305 may render or generate depth image model 318 based on a three-dimensional model of what the scene looks like (e.g., a scene model). The three-dimensional model of the scene may be stored in memory and/or updated based on depth image/enhanced depth image 316 and/or other data. In some examples, depth image model 318 may be a raycasted depth image generated based on camera pose 317 and the three-dimensional model.

As shown, depth enhancement decision module 302 may receive depth image model 318 and depth image 311. Based on depth image model 318 and/or depth image 311, depth enhancement decision module 302 may generate a depth image enhancement indicator associated with depth image 311 such that the depth image enhancement indicator indicates whether depth image enhancement should be performed for depth image 311 or skipped for depth image 311. For example, if depth enhancement is to be performed, the depth image enhancement indicator may be provided as enhance signal 313 and, if not, the depth image enhancement indicator may be provided as skip signal 314.

Depth enhancement decision module 302 may determine the depth image enhancement indicator using any suitable technique or techniques. In some examples, depth enhancement decision module 302 may compare depth image 311 and depth image model 318 to determine the depth image enhancement indicator. In some examples, depth enhancement decision module 302 may compare a fill rate (e.g., a percentage or amount of pixels that are missing depth values and need to be filled) of depth image 311 and depth image model 318. If the difference between the fill rate of depth image 311 and depth image model 318 is greater than (or greater than or equal to) a predetermined threshold (e.g., a predetermined threshold of about 30% or the like), depth enhancement decision module 302 may provide enhance signal 313 and, if not, depth enhancement decision module 302 may provide skip signal 314. For example, since device 200 may operate at a high frame rate, the depth fill rate of depth image 311 and depth image model 318 may be expected to be similar and a difference may indicate the camera of device 200 has moved to a location where the hardware stereo matching module may not be able to generate depth values.

In addition or in the alternative, depth enhancement decision module 302 may determine the depth image enhancement indicator based on determining a surface of depth image model 318 being less than a depth threshold from an estimated camera position as indicated via camera pose 317 or comparing a fill rate of depth image 311 to a fill rate threshold or the like. For example, a determination that a surface of depth image model 318 is less than a depth threshold (e.g., less than 3 to 10 cm or the like) from an estimated camera position may indicate the discussed predetermined disparity position (or hardware based maximum disparity position) may not be capable of finding the optimal disparity (e.g., as the depth, d, of the surface may be at a position such that $d<f*b/MaxDisp$). Furthermore, a determination that a fill rate of depth image 311 is greater than a fill rate threshold (e.g., a predetermined threshold such as about 30%) may provide a similar indication.

In such examples where enhance signal 313 is asserted, stereo matching module 301 may be asserted or turned on to enhance depth image 311. If not, depth image enhancement may be skipped. Such depth enhancement determinations may save computing resources and provide fast operation for device 200. As discussed, in some embodiments, scene perception module 303 and depth enhancement decision module 302 may provide high level control over stereo matching module 301 (e.g., based on depth image model 318 and the discussed depth enhancement decision techniques). In other embodiments, other high level module or components may provide enhance signal 313 and skip signal 314 or the like. For example, any high level control components that may provide feedback and/or decision making for implementing depth enhancement decision making in real time may be provided.

As shown, when skip signal 314 is asserted, depth image 311 may not be enhanced and depth image 311 may be provided via depth image/enhanced depth image 316 for continued processing (e.g., for subsequent depth images) as discussed herein. When enhance signal 313 is asserted, depth image 311 may be enhanced by stereo matching module 301 to generate enhanced depth image 315, which may be provided via depth image/enhanced depth image 316 for continued processing. In such examples, for some or all missing pixel depth values (e.g., for pixel positions having no valid depth value) of depth image 311, stereo matching module 301 may generate pixel depth values to provide enhanced depth image 315.

Stereo matching module 301 may generate such pixel depth values for missing pixel depth values of depth image 311 using any suitable technique or techniques. In some examples, stereo matching module 301 may generate a window around a pixel position of an individual pixel in a reference image (e.g., left image 102 or the like) and search for a best match window from among search windows within a target image (e.g., right image 103 or the like) such that search windows extend only from a first search window positioned greater than the discussed predetermined disparity position from a collocated window in the target image to a last search window at a maximum disparity position from the collocated window. The maximum disparity position may be at a preselected position or at a maximum available position (e.g., at the end of the image) or the like. The best match window may be determined as a window of the search windows that maximizes or minimizes a metric determined for each of the search windows (e.g., minimizes a sum of squared differences). Furthermore, the metric for the best match window may be compared to a threshold to verify there is indeed a match (e.g., that the best match is not a best invalid match). For example, a sum of squared differences threshold of 512 may be applied for a 7 by 9 rectangular template or window (e.g., 7 vertical pixels by 9 horizontal pixels).

Figure 4:
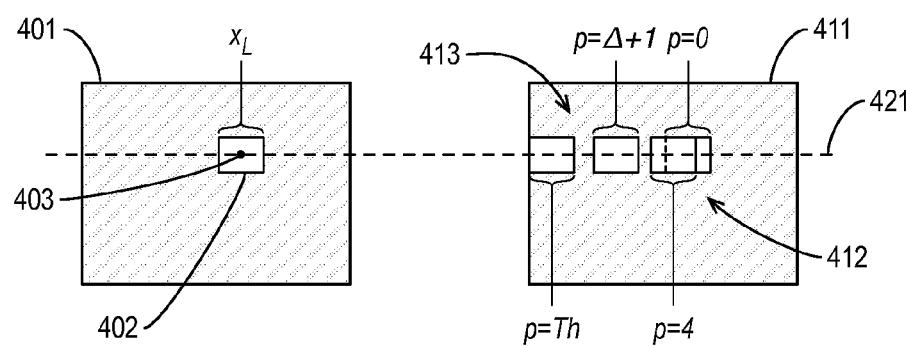
FIG. 4 illustrates an example best match window search for a pixel of a reference image within a target image.

FIG. 4 illustrates an example best match window search 400 for a pixel 403 of a reference image 401 within a target image 411, arranged in accordance with at least some implementations of the present disclosure. In the example of FIG. 4, reference image 401 is a left image, however, reference image 401 may be a right image in other examples. Furthermore, reference image 401 may be associated with a depth image having missing pixel depth values at various pixel locations including an individual pixel location of pixel 403. As discussed herein, for pixel locations of the depth image having depth values (e.g., as determined via a stereo matching module implemented via hardware), no depth value may need to be determined. For pixel locations of the depth image having missing pixel depth values and for depth images for which depth enhancement is enabled or asserted, pixel depth values may be determined.

As shown in FIG. 4, a window 402 may be generated around the pixel position of pixel 403. Window 402 may have any shape and size such as a rectangular shape having 7 vertical pixels by 9 horizontal pixels. For example, pixel values within window 402 may be saved to memory and a best match window within target image 411 along base line 421 may be determined as a window having the closest match of pixel values to those within window 402. Such a match may be determined using any suitable technique or techniques such as generating a metric for each search window and maximizing or minimizing the metric or the like. For example, the best match search window may be a search window that minimizes a sum of squared differences between window 402 and the search windows. In some examples, the metric may also be compared to a threshold to determine the best match is indeed a match. The disparity associated with the best match window may be converted to a depth value for the pixel based on d=f*b/disp, where f and b are the focal length and base line, respectively, and disp, is the disparity associated with the best match window.

As shown with respect to search windows 412, the previously applied (e.g., via hardware) stereo matching may include a collocated search window (e.g., such that the offset, p, between window 402 and the collocated window is zero, p=0) and search windows that are each offset by one pixel value (e.g., p=1, 2, 3 . . . Δ) from the collocated window. For example, the hardware stereo matching may be applied only up to a predetermined disparity position such as a hardware based maximum disparity position or the like. Such a predetermined disparity position or hardware based maximum disparity position may be characterized as MaxDisp or Δ (e.g., as shown in FIG. 4) or the like. In the example of FIG. 4, the hardware stereo matching may have found no suitable match for pixel 403 within the range of search windows 412 extending from the collocated search window (e.g., p=0) to the search window associated with the predetermined disparity position or hardware based maximum disparity position or the like (e.g., p=Δ).

As discussed, stereo matching module 301 may generate window 402 around the pixel position of pixel 403 reference image 401 and search for a best match window from among search windows 413 within target image 411. Search windows 413 may include any suitable search windows not previously searched via the hardware stereo matching. In some embodiments, search windows 413 may extend only from a first search window positioned greater than a predetermined disparity position from a collocated window in target image 411 to a last search window at a maximum disparity position from the collocated window. For example, the first search window may be one or more pixels from the predetermined disparity position or hardware based maximum disparity position or the like. In the example of FIG. 4, the first search window of search windows 413 may be at an offset or disparity with respect to the collocated window of p=Δ+1. In the example of FIG. 4, the first search window is at a one pixel offset with respect to the predetermined disparity position or hardware based maximum disparity position or the like. However, the first search window may be at any offset such as two pixels or three pixels or the like. In some examples, the first search window may overlap the last search window performed by the hardware stereo matching.

Search windows 413 may extend from the first search window to a last search window or a search window at a maximum disparity position or the like. The search windows may be offset with respect to each other by one pixel or two pixels or the like. The last search window of search windows 413 may be at any suitable position such as at a maximum search (e.g., a predetermined pixel limit from the first search window) or threshold search position with respect to the collocated window of target image 411 or the like. In some examples, the last search window may be the last available position within target image 411 along base line 421 such that p=Th (e.g., the end of target image 411 has been reached).

As discussed, search windows 413 may be evaluated based on a metric determined for each search window as compared to window 402. The metric may be any metric such as a sum of squared differences or the like. In some embodiments, the metric for each search window of search windows 413 may be determined or generated based on an integral image data structure. For example, generating the metric for each search window (e.g., at each value of p) may be time consuming and may involve redundant computations. To avoid such redundancies and to provide faster computations an integral image data structure may be used. Implementing such an integral data structure may include determining and storing in memory, for the first search window (e.g. p=Δ+1) of search windows 413, pixel metric values associated with generating the selected metric (e.g., squared differences for a sum of squared differences metric). For the next search window (e.g. p=Δ+2), the overlapping pixel metric values may be read from memory (and non-overlapping pixel metric values that are no longer needed may be discarded) and those pixel metric values that are needed for the next search window but were not needed for the first search window may be determined and stored in memory as well as used to determine the metric for the next search window. Such processing may continue through the final search window and may save substantial computational resources as overlapping pixel metric values are determined only once.

In some embodiments, all of the pixel metric values for all search windows 413 may be determined at a first operation and saved to memory and, when determining a metric for a particular search window of search windows 413, only the needed pixel metric values (e.g., only those pixel metric values within the particular search window) may be pulled from memory and used to determine the metric for the particular search window. Such processing may also save on computational resources as overlapping pixel metric values are determined only once and may offer the advantage of batching the generation of the pixel metric values for parallel processing or the like. Using such integral image data structure techniques may reduce the time complexity of searching search windows from O(NT) to O(N) where N and T may be the number of pixels of the image being searched and the number of pixels in the search window or template, respectively.

Furthermore, substantial computational and times savings may be provided by not re-searching search windows 412, which have previously been searched by hardware stereo matching to generate depth image 311. For example, if the hardware stereo matching searches from zero disparity or offset to MaxDisp disparity or offset, stereo matching module 301 may search only from MaxDisp+1 through a maximum offset (e.g., a preset maximum or a theoretical maximum such as an end of target image 411). Such limitations of search range for stereo matching module 301 may provide a search range of only about one-third of the entire original search range. Also, as discussed, stereo matching module 301 may generate pixel depth values for those pixel positions of depth image 311 that are missing pixel depth values to generate enhanced depth image 315 (e.g., instead of generating an entire depth image). Such computational and time savings may provide for depth image/enhanced depth image 316 to be provided in real time. For example, depth image/enhanced depth image 316 may be provided to other modules or components of device 200 in real time to perform object detection, object tracking, gesture recognition and device control based on such gestures, facial pose recognition and device control based on such facial gestures, three-dimensional scene reconstruction, scene understanding, virtual reality, augmented reality, perceptual computing, volumetric reconstruction, or the like.

The discussed search via search windows 413 as implemented via stereo matching module 301 may compensate for a limited search range of hardware stereo matching as discussed herein. In some examples, the limited search range may limit searching when the camera is at close range to the surface or object or the like for which depth values are being determined. For example, if the depth of such a surface or object or the like is less than associated disparity search range (e.g., when depth d<f*b/MaxDisp), the depth value may not be found by hardware stereo matching since the true disparity match exceeds the search range (e.g., exceeds MaxDisp). The discussed search via stereo matching module 301 may find such a true disparity match based on searching search windows 413.

Returning to FIG. 3, stereo matching module 301 may determine such pixel depth values for some or all pixel positions of depth image 311 having missing pixel depth values by repeating the window generation (in the reference image), window search (in the target image), and depth value generation (e.g., based on the disparity associated with the best match window) operations for such pixel positions. Stereo matching module 301 may update such depth values to generate enhanced depth image 315, which may be provided to scene perception module 303 for further processing.

In some embodiments, system 200 may provide for color images (e.g., via color camera 202 and/or associated image processing hardware) and depth images (e.g., via depth image/enhanced depth image 316) of a scene in real time. Such images may have high quality and may be used for presentation to a user and/or for a variety of applications such as those discussed herein. Furthermore, as discussed, the devices and techniques discussed herein may generate an enhanced depth image from a depth image having mixing pixel depth values.

Figure 5:
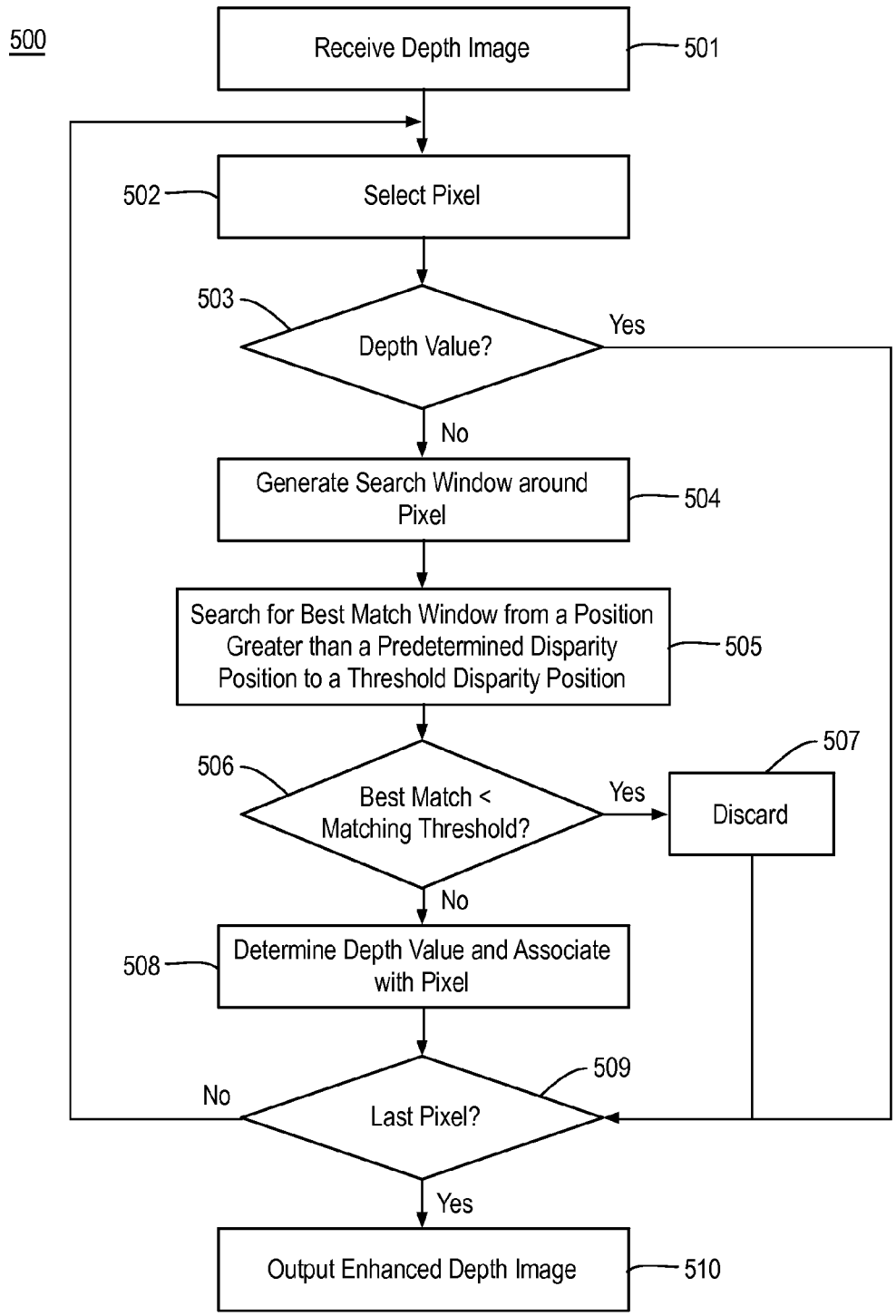
FIG. 5 illustrates an example process for generating an enhanced depth image.

FIG. 5 illustrates an example process 500 for generating an enhanced depth image, arranged in accordance with at least some implementations of the present disclosure. Process 500 may include one or more operations 501-510 as illustrated in FIG. 5. Process 500 or portions thereof may be performed by a device or system to generate an enhanced depth image. Process 500 or portions thereof may be repeated for any number of input depth images, portions thereof, or the like.

Process 500 may begin at operation 501 "Receive Depth Image", where a depth image may be received or generated or the like. For example, the depth image may include missing pixel depth values and a depth image enhancement may be asserted or enabled for the depth image.

Processing may continue at operation 502, "Select Pixel", where a pixel of the depth image may be selected. The pixel may be selected using any suitable technique or techniques. For example, a scanning pattern (e.g., a raster scan) may be provided for the depth image, which may be followed to select the first and subsequent pixels of the depth image.

Processing may continue at decision operation 503, "Depth Value?", where a determination may be made as to whether a depth value is associated with the selected pixel. For example, a depth value of zero or invalid or the like may indicate no depth value is associated with the selected pixel and a depth value within an allowed range may indicate a depth value (e.g., a valid depth value) is associated with the selected pixel. If a depth value is associated with the selected pixel, processing may continue at decision operation 509 as discussed below.

If no depth value is associated with the selected pixel, processing may continue at operation 504, "Generate Search Window around Pixel", where a window may be generated around the pixel location of the selected pixel within a reference image as discussed with respect to FIG. 4 and elsewhere herein. The window may have any suitable shape such as square or rectangular and any suitable size.

Processing may continue at operation 505, "Search for Best Match Window from a Position Greater than a Predetermined Disparity Position to a Threshold Disparity Position", where a search may be performed for a best match window from multiple search windows extending from a position greater than a predetermined disparity position (e.g., one pixel greater or the like) from a collocated window (e.g., with respect to the window generated at operation 504) within a target image to a threshold disparity position (e.g., a predetermined search range or maximum search range based on the end of image being found) as discussed with respect to FIG. 4 and elsewhere herein. Operation 505 may generate a best match window as a window of the multiple search windows optimizing a metric (e.g., minimizing a SSD).

Processing may continue at decision operation 506, "Best Match<Matching Threshold?", where a determination may be made as to whether the metric associated with the best match window is less than (as shown) or greater than or the like a predetermined or heuristically determined threshold such as a matching threshold or the like. The threshold may be any suitable value. In examples where the metric is SSD and the window and search windows are 9 by 7 pixel windows, the threshold may be a value of about 512. If the metric does not pass the threshold test of operation 506, processing may continue at operation 507, "Discard" where the best match window may be discarded as a mismatch (e.g., even the best match may not be an actual match) and operation 509 as discussed below.

If the metric does pass the threshold test of operation 506, processing may continue at operation 508, "Determine Depth Value and Associate with Pixel", where a depth value associated with the best match window may be determined and associated with the selected pixel. The depth value may be determined using any suitable technique such as multiplying the focal distance and baseline of the camera used to generate the reference and target images and dividing the result by the disparity between the window of the reference image and the best match window of the target image (e.g., d=f*b/disp).

Processing may continue from any of operations 503, 507, 508 at decision operation 509, "Last Pixel?", where a determination may be made as to whether the last pixel of the depth image has been processed. If not, processing may continue at operation 502 where processing may continue as discussed herein. If so, processing may continue at operation 510, "Output Enhanced Depth Image", where the enhanced depth image (e.g., with some or all missing pixel depth values replaced with valid depth values) may be output for use in a wide range of applications.

As discussed, process 500 may be used to generate an enhanced depth image. Process 500 may be performed in parallel or in series for any number of depth images, portions thereof, or the like. In some examples, process 500 may be provided implemented via a processor to enhance depth images. In some examples, process 500 may be performed by stereo matching module 301 as implemented via a processor.

As discussed, the devices and techniques discussed herein may provide for a determination as to whether an enhanced depth image should be generated for a current depth image based on a depth image model and/or the current depth image.

Figure 6:
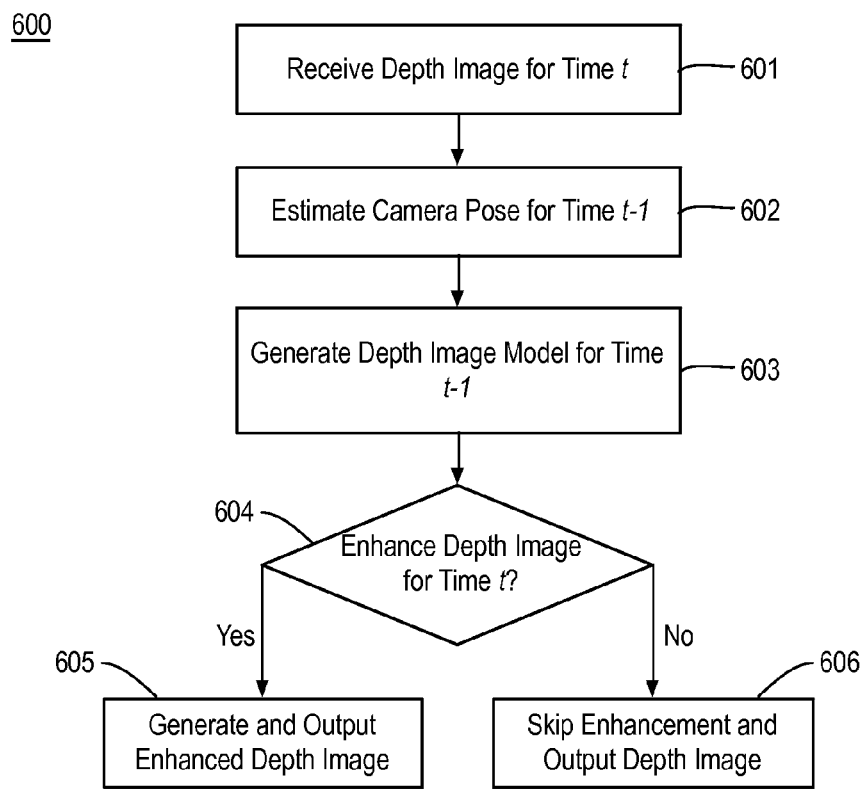
FIG. 6 illustrates an example process for providing a depth image enhancement decision.

FIG. 6 illustrates an example process 600 for providing a depth image enhancement decision, arranged in accordance with at least some implementations of the present disclosure. Process 600 may include one or more operations 601-606 as illustrated in FIG. 6. Process 600 or portions thereof may be performed by a device or system to depth image enhancement decision. Process 600 or portions thereof may be repeated for any number of input depth images, portions thereof, or the like.

Process 600 may begin at operation 601, "Receive Depth Image for Time t", where a depth image may be received for time t. For example, the depth image may be received for a current time based on a frame rate of a device such as device 200. The received depth image may include any suitable depth image as discussed herein. In some examples, the depth image for time t may be received via depth enhancement decision module 302 as implemented via a processor.

Processing may continue at operation 602, "Estimate Camera Pose for Time t−1", where a camera pose may be estimated for time t−1. For example, the camera pose may be estimated based on a depth image or enhanced depth image for time t−1 (e.g., a previous depth image or enhanced depth image) and/or previous camera poses or models of the scene. The camera pose may include any suitable data or information representative of a determined camera pose such as camera position and camera orientation. In some examples, the camera pose for time t−1 may be estimated by scene perception module 303 as implemented via a processor.

Processing may continue at operation 603, "Generate Depth Image Model for Time t−1", where a depth image model may be generated based on the camera pose estimated at operation 602 and a model of the scene (e.g., a scene model) such as a three-dimensional model of the scene or the like. The depth image model may include any suitable model and/or data representing a scene such as depth image data and the depth image model may be generated using any suitable technique or techniques such as a rendering or raycasting based on the camera pose and scene model. In some examples, the depth image model for time t−1 may be generated via scene perception module 303 as implemented via a processor.

Processing may continue at decision operation 604, "Enhance Depth Image for Time t?", where a determination may be made as to whether the depth image for time t is to be enhanced or not. Such a determination may be made using any suitable technique or techniques. In some examples, the determination may be made via depth enhancement decision module 302 as implemented via a processor. In some examples, the depth image for time t and the depth image model for time t−1 may be compared to determine whether enhancement is to be performed. In some examples, a fill rate (e.g., a percentage or amount of pixels that are missing depth values and need to be filled) of the depth image for time t and a fill rate of the depth image model for time t−1 may be compared and, if the difference is greater than (or greater than or equal to) a predetermined threshold, enhancement may be performed and, if not, enhancement may be skipped.

In addition or in the alternative, a determination may be made as to whether any surface of the depth image model for time t−1 is less than a depth threshold from an estimated camera position or a fill rate of the depth image for time t may be compared to a fill rate threshold or the like. For example, a determination that a surface of the depth image model for time t−1 is less than a depth threshold from an estimated camera position may indicate the discussed predetermined disparity position (or hardware based maximum disparity position) may not be capable of finding the optimal disparity. Furthermore, a determination that a fill rate of the depth image for time t is greater than a fill rate threshold may provide a similar indication.

If the depth image for time t is to be enhanced, processing may continue at operation 605, "Generate and Output Enhanced Depth Image", where the depth image for time t may be enhanced and output using any suitable technique or techniques such as those discussed with respect to process 500. If the depth image for time t is not to be enhanced, processing may continue at operation 605, "Skip Enhancement and Output Depth Image", where enhancement may be skipped and the depth image for time t may be output.

As discussed, process 600 may be used to provide a depth image enhancement decision and/or processing based on the depth image enhancement decision. Process 600 may be performed in parallel or in series for any number of depth images, portions thereof, or the like. In some examples, process 600 may be provided implemented via a processor to provide depth image enhancement decisions.

The discussed techniques may provide for high quality and real time depth images. Such depth images may be used for a wide range of applications as discussed herein.

Figure 7:
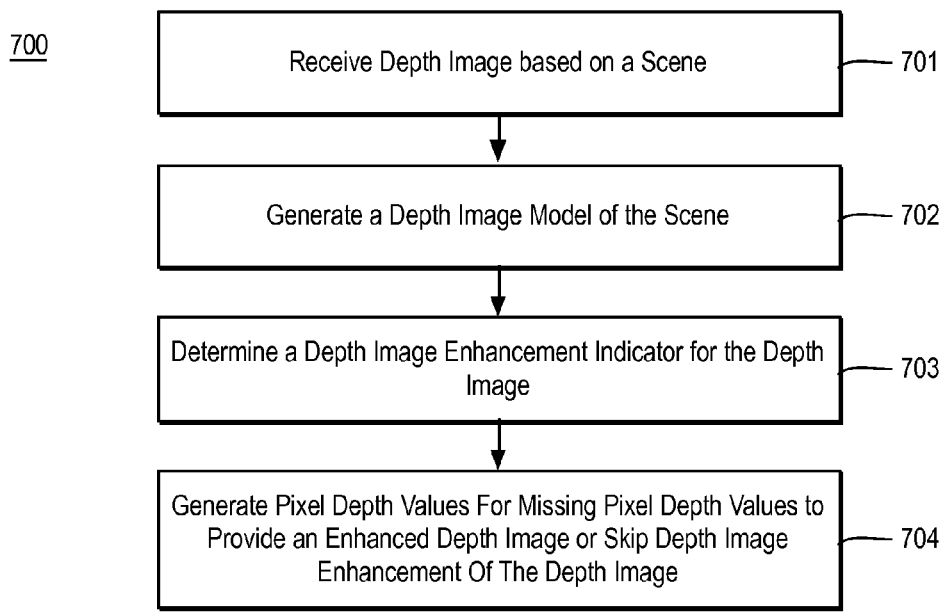
FIG. 7 is a flow diagram illustrating an example process for performing stereoscopic imaging.

FIG. 7 is a flow diagram illustrating an example process 700 for performing stereoscopic imaging, arranged in accordance with at least some implementations of the present disclosure. Process 700 may include one or more operations 701-704 as illustrated in FIG. 7. Process 700 may form at least part of a stereoscopic imaging process. By way of non-limiting example, process 700 may form at least part of a stereoscopic imaging process as performed by any device, system, or combination thereof as discussed herein such as device 200. Furthermore, process 700 will be described herein with reference to system 800 of FIG. 8, which may perform one or more operations of process 700.

Figure 8:
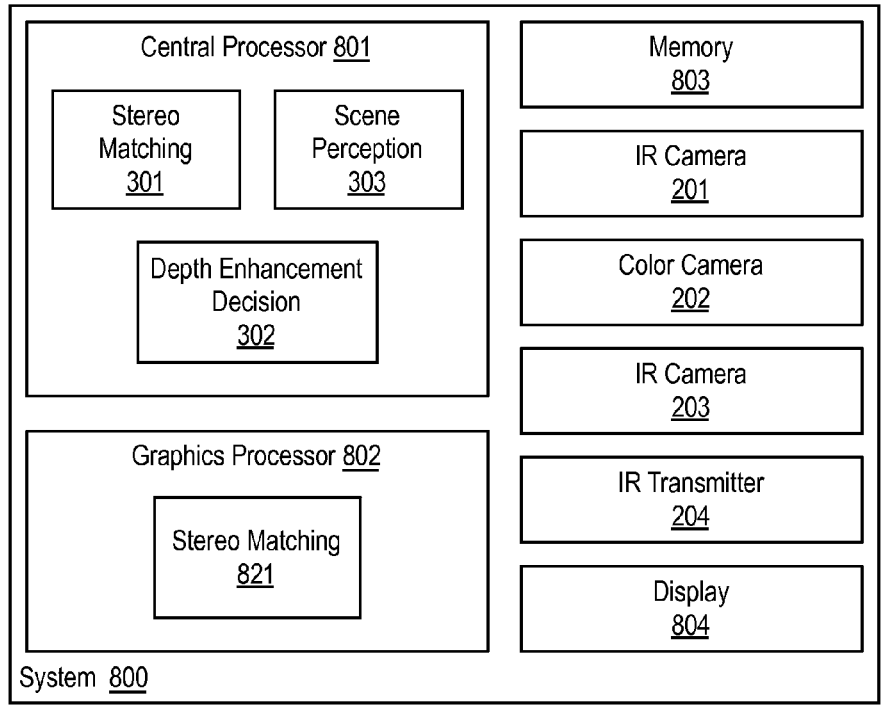
FIG. 8 is an illustrative diagram of an example system for performing stereoscopic imaging.

FIG. 8 is an illustrative diagram of an example system 800 for performing stereoscopic imaging, arranged in accordance with at least some implementations of the present disclosure. As shown in FIG. 8, system 800 may include a central processor 801, a graphics processor 802, a memory 803, infrared cameras 201, 203, color camera 202, infrared transmitter 204, and/or a display 804. Also as shown, central processor 801 may include stereo matching module 301, depth enhancement decision module 302, and scene perception module 303 and graphics processor 802 may include a stereo matching module 821. In the example of system 800, memory 803 may store depth images, depth image data, enhanced depth images, enhanced depth image data, image data, pixel depth values, disparity values, search window metrics, integral image data, IR images, IR image data, depth image enhancement indicators, and/or any other data as discussed herein.

As shown, in some examples, stereo matching module 301, depth enhancement decision module 302, and scene perception module 303 may be implemented via central processor 801 and stereo matching module 821 may be implemented via graphics processor 802. In an embodiment, stereo matching module 821 may be implemented via hardware with a predetermined disparity position, a hardware based maximum disparity position, or a graphics processor based maximum disparity position that may limit a disparity search range of stereo matching module 821. In some examples, stereo matching module 301 may be provided as software implemented via central processor 801 to provide additional disparity search range as discussed herein.

Graphics processor 802 may include any number and type of graphics processing units that may provide the stereo matching operations and/or other operations as discussed herein. For example, graphics processor 802 may include circuitry dedicated to manipulate image data, or the like obtained from memory 803. Central processor 801 may include any number and type of processing units or modules that may provide control and other high level functions for system 800 and/or provide any operations as discussed herein. Memory 803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 803 may be implemented by cache memory.

In an embodiment, stereo matching module 821 may be implemented via an execution unit (EU) of graphics processor 802. The EU may include, for example, programmable logic or circuitry such as a logic core or cores that may provide a wide array of programmable logic functions. In an embodiment, stereo matching module 821 may be implemented via dedicated hardware such as fixed function circuitry or the like. Fixed function circuitry may include dedicated logic or circuitry and may provide a set of fixed function entry points that may map to the dedicated logic for a fixed purpose or function. In an embodiment, stereo matching module 821 may be implemented via an image processor or the like.

As discussed herein, color camera 202 may attain color images of a scene and infrared cameras 201, 203, in response to IR light emitted by infrared transmitter 204 to illuminate the scene, may attain IR images (e.g., two or more stereoscopic IR images such as reference and target images for the generation of a depth image). Display 804 may display such color images, IR images, depth images, or other graphical interface information (e.g., responses based on gesture or face recognition or the like) generated based on such images.

Returning to discussion of FIG. 7, process 700 may begin at operation 701, "Receive Depth Image based on a Scene", where a depth image based on a scene may be received. For example, the depth image may be a current depth image in a sequence of depth images. In some embodiments, the depth image may be generated via stereo matching module 821 as implemented by graphics processor 802 based on IR image data (e.g., stereoscopic IR images) received from infrared cameras 201, 203 and the depth image may be received by depth enhancement decision module 302 and/or stereo matching module 301 as implemented by central processor 801. In other examples, the depth image may be received from a remote device. In some examples, the depth image may received from a hardware component such as stereo matching module 821 as implemented by graphics processor 802 such that the depth image was generated based on a predetermined disparity position (e.g., a hardware based maximum disparity position) limitation on a search range for a best match search window.

Processing may continue at operation 702, "Generate a Depth Image Model of the Scene", where a depth image model of the scene may be generated. The depth image model may be generated using any suitable technique or techniques. For example, the depth image model may be generated based on a sequence of depth images up to and including a depth image previous to the current depth image. In some embodiments, the depth image model may be generated by scene perception module 303 as implemented by central processor 801. In some examples, the depth image model may include depth image data generated based on a three-dimensional model of the scene. For example, the three-dimensional model may be based on a sequence of previous depth images all previous to the depth image received at operation 701. In some examples, generating the depth image model may include estimating a camera pose associated with a previous depth image of the sequence of depth images and generating the depth image model based on the camera pose and the three-dimensional model of the scene.

Processing may continue at operation 703, "Determine a Depth Image Enhancement Indicator for the Depth Image", where a depth image enhancement indicator associated with the depth image may be determined based on the depth image and the depth image model of the scene. The depth image enhancement indicator may be determined using any suitable technique or techniques. In some embodiments, the depth image enhancement indicator may be determined by depth enhancement decision module 302 as implemented by central processor 801. In some examples, determining the depth image enhancement indicator may include determining whether a difference between a fill rate of the depth image and a fill rate of the depth image model of the scene is greater than a threshold. In some examples, determining the depth image enhancement indicator may include determining a surface of the depth image model is less than a depth threshold from an estimated camera position or comparing a fill rate of the depth image to a fill rate threshold.

Processing may continue at operation 704, "Generate Pixel Depth Values For Missing Pixel Depth Values to Provide an Enhanced Depth Image or Skip Depth Image Enhancement Of The Depth Image", where, when the depth image enhancement indicator indicates enhancement, one or more pixel depth values for missing pixel depth values of the depth image may be generated to provide an enhanced depth image or, when the depth image enhancement indicator indicates no enhancement, depth image enhancement of the depth image may be skipped. For example, stereo matching module 301 as implemented by central processor 801 may generate the missing pixel depth values of the depth image to provide the enhanced depth image when the depth image enhancement indicator indicates enhancement.

In some examples, generating the one or more pixel depth values may include, for an individual pixel having a missing depth value, generating a window around a pixel position of the individual pixel in a reference image and searching for a best match window from multiple search windows within a target image such that the search windows extend only from a first search window positioned greater than a predetermined disparity position from a collocated window in the target image to a last search window at a maximum disparity position from the collocated window. In some examples, the predetermined disparity position may be a hardware based maximum disparity position, a graphics processor based maximum disparity position, or the like. In some examples, the first search window may have a one pixel disparity from the predetermined disparity position. In some examples, the best match window may include a search window of the search windows having a minimum sum of squared difference that is less than a predetermined threshold. In some examples, the searching may include determining a metric for each of the plurality of search windows and wherein the metrics are determined based on an integral image data structure. In some examples, the reference image and the target image may include infrared images attained via infrared cameras 201, 203.

Process 700 may be repeated any number of times either in series or in parallel for any number depth images or the like. For example, process 700 may provide for the implementation of a stereoscopic imaging via a device.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
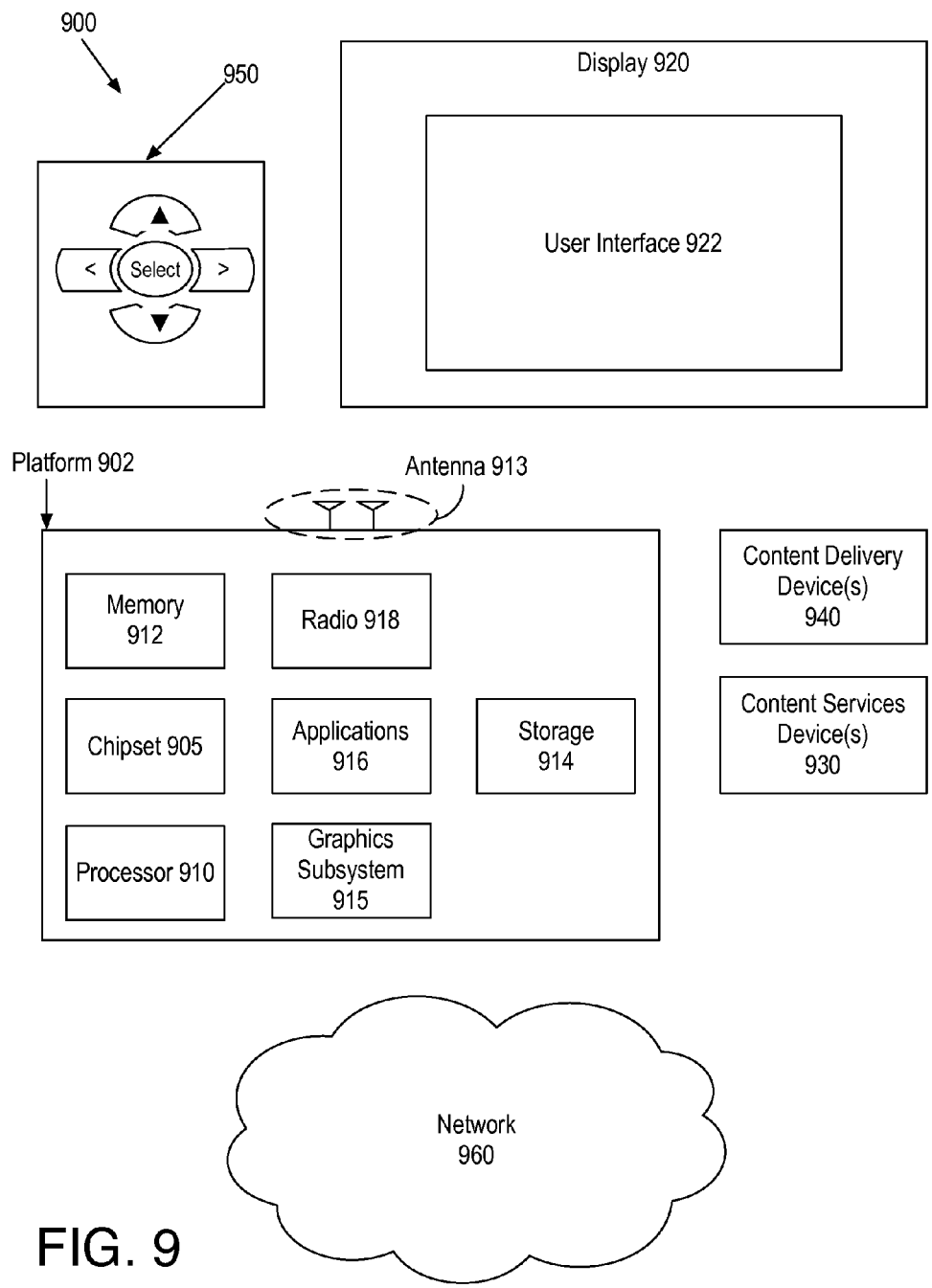
FIG. 9 is an illustrative diagram of an example system.

FIG. 9 is an illustrative diagram of an example system 900, arranged in accordance with at least some implementations of the present disclosure. In various implementations, system 900 may be a mobile system although system 900 is not limited to this context. System 900 may implement and/or perform any modules or techniques discussed herein. For example, system 900 may be incorporated into a personal computer (PC), sever, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 900 may be implemented via a cloud computing environment.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of uni-directionally or bi-directionally communicating content between content providers and platform 902 and/display 920, via network 960 or directly. It will be appreciated that the content may be communicated uni-directionally and/or bi-directionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of navigation controller 950 may be used to interact with user interface 922, for example. In various embodiments, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In various embodiments, navigation controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
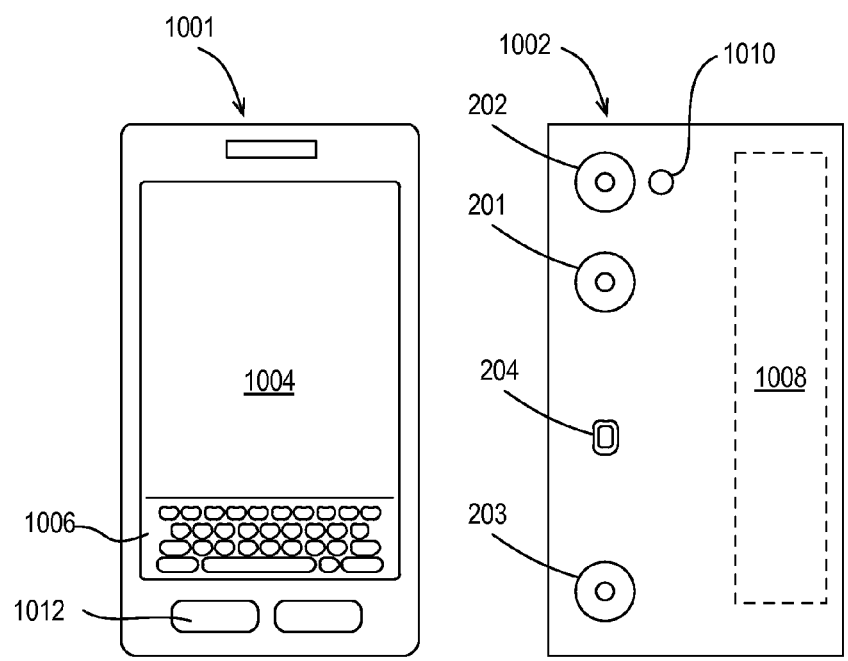
FIG. 10 illustrates an example small form factor device, all arranged in accordance with at least some implementations of the present disclosure.

As described above, system 900 may be embodied in varying physical styles or form factors. FIG. 10 illustrates an example small form factor device 1000, arranged in accordance with at least some implementations of the present disclosure. In some examples, system 900 may be implemented via device 1000. In other examples, other systems discussed herein or portions thereof may be implemented via device 1000. In various embodiments, for example, device 1000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 10, device 1000 may include a housing with a front 1001 and a back 1002. Device 1000 includes a display 1004, an input/output (I/O) device 1006, color camera 202, infrared camera 201, infrared camera 203, infrared transmitter 204, and an integrated antenna 1008.

Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. As shown, device 1000 may include color camera 202 and a flash 1010 integrated into back 1002 (or elsewhere) of device 1000. In other examples, color camera 202 and flash 1010 may be integrated into front 1001 of device 1000 or both front and back cameras may be provided. Color camera 202 and flash 1010 may be components of a camera module to originate color image data processed into streaming video that is output to display 1004 and/or communicated remotely from device 1000 via antenna 1008 for example. Furthermore, infrared camera 201, infrared camera 203, and infrared transmitter 204 may originate IR image data to be processed to generate depth images as discussed herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for performing stereoscopic imaging via a device comprises receiving a depth image based on a scene, generating a depth image model of the scene, determining a depth image enhancement indicator associated with the depth image based on the depth image and the depth image model of the scene, and generating, when the depth image enhancement indicator indicates enhancement, one or more pixel depth values for missing pixel depth values of the depth image to provide an enhanced depth image or skipping, when the depth image enhancement indicator indicates no enhancement, depth image enhancement of the depth image.

Further to the first embodiments, generating the one or more pixel depth values comprises, for an individual pixel having a missing depth value, generating a window around a pixel position of the individual pixel in a reference image and searching for a best match window from a plurality of search windows within a target image, wherein the search windows extend only from a first search window positioned greater than a predetermined disparity position from a collocated window in the target image to a last search window at a maximum disparity position from the collocated window.

Further to the first embodiments, generating the one or more pixel depth values comprises, for an individual pixel having a missing depth value, generating a window around a pixel position of the individual pixel in a reference image and searching for a best match window from a plurality of search windows within a target image, wherein the search windows extend only from a first search window positioned greater than a predetermined disparity position from a collocated window in the target image to a last search window at a maximum disparity position from the collocated window, wherein the depth image is received from a hardware component and the predetermined disparity position comprises a hardware based maximum disparity position.

Further to the first embodiments, generating the one or more pixel depth values comprises, for an individual pixel having a missing depth value, generating a window around a pixel position of the individual pixel in a reference image and searching for a best match window from a plurality of search windows within a target image, wherein the search windows extend only from a first search window positioned greater than a predetermined disparity position from a collocated window in the target image to a last search window at a maximum disparity position from the collocated window, wherein the first search window has a one pixel disparity from the predetermined disparity position.

Further to the first embodiments, generating the one or more pixel depth values comprises, for an individual pixel having a missing depth value, generating a window around a pixel position of the individual pixel in a reference image and searching for a best match window from a plurality of search windows within a target image, wherein the search windows extend only from a first search window positioned greater than a predetermined disparity position from a collocated window in the target image to a last search window at a maximum disparity position from the collocated window, wherein the depth image is received from a hardware component and the predetermined disparity position comprises a hardware based maximum disparity position and/or wherein the first search window has a one pixel disparity from the predetermined disparity position and/or wherein the reference image and the target image comprise infrared images.

Further to the first embodiments, generating the one or more pixel depth values comprises, for an individual pixel having a missing depth value, generating a window around a pixel position of the individual pixel in a reference image and searching for a best match window from a plurality of search windows within a target image, wherein the search windows extend only from a first search window positioned greater than a predetermined disparity position from a collocated window in the target image to a last search window at a maximum disparity position from the collocated window, wherein the best match window comprises a search window of the search windows having a minimum sum of squared difference that is less than a predetermined threshold.

Further to the first embodiments, generating the one or more pixel depth values comprises, for an individual pixel having a missing depth value, generating a window around a pixel position of the individual pixel in a reference image and searching for a best match window from a plurality of search windows within a target image, wherein the search windows extend only from a first search window positioned greater than a predetermined disparity position from a collocated window in the target image to a last search window at a maximum disparity position from the collocated window, wherein the searching comprises determining a metric for each of the plurality of search windows and wherein the metrics are determined based on an integral image data structure.

Further to the first embodiments, generating the one or more pixel depth values comprises, for an individual pixel having a missing depth value, generating a window around a pixel position of the individual pixel in a reference image and searching for a best match window from a plurality of search windows within a target image, wherein the search windows extend only from a first search window positioned greater than a predetermined disparity position from a collocated window in the target image to a last search window at a maximum disparity position from the collocated window, wherein the reference image and the target image comprise infrared images.

Further to the first embodiments, the depth image model comprises depth image data generated based on a three-dimensional model of the scene and the three-dimensional model is based on a sequence of previous depth images all previous to the depth image.

Further to the first embodiments, the depth image model comprises depth image data generated based on a three-dimensional model of the scene, the three-dimensional model is based on a sequence of previous depth images all previous to the depth image, and generating the depth image model of the scene comprises estimating a camera pose associated with a first previous depth image and generating the depth image model based on the camera pose and the three-dimensional model of the scene.

Further to the first embodiments, the depth image model comprises depth image data generated based on a three-dimensional model of the scene, the three-dimensional model is based on a sequence of previous depth images all previous to the depth image, and generating the depth image model of the scene comprises estimating a camera pose associated with a first previous depth image and generating the depth image model based on the camera pose and the three-dimensional model of the scene.

Further to the first embodiments, determining the depth image enhancement indicator comprises determining whether a difference between a fill rate of the depth image and a fill rate of the depth image model of the scene is greater than a threshold.

Further to the first embodiments, determining the depth image enhancement indicator comprises at least one of determining a surface of the depth image model is less than a depth threshold from an estimated camera position or comparing a fill rate of the depth image to a fill rate threshold.

In one or more second embodiments, a device comprises a memory to store a depth image based on a scene and a processor to generate a depth image model of the scene, to determine a depth image enhancement indicator associated with the depth image based on the depth image and the depth image model of the scene, and to generate, when the depth image enhancement indicator indicates enhancement, one or more pixel depth values for missing pixel depth values of the depth image to provide an enhanced depth image or to skip, when the depth image enhancement indicator indicates no enhancement, depth image enhancement of the depth image.

Further to the second embodiments, the processor to generate the one or more pixel depth values comprises, for an individual pixel having a missing depth value, the processor to generate a window around a pixel position of the individual pixel in a reference image and to search for a best match window from a plurality of search windows within a target image, wherein the search windows extend only from a first search window positioned greater than a predetermined disparity position from a collocated window in the target image to a last search window at a maximum disparity position from the collocated window.

Further to the second embodiments, the processor to generate the one or more pixel depth values comprises, for an individual pixel having a missing depth value, the processor to generate a window around a pixel position of the individual pixel in a reference image and to search for a best match window from a plurality of search windows within a target image, wherein the search windows extend only from a first search window positioned greater than a predetermined disparity position from a collocated window in the target image to a last search window at a maximum disparity position from the collocated window, wherein the device further comprises a graphics processor to generate the depth image, wherein the predetermined disparity position comprises a hardware based maximum disparity position.

Further to the second embodiments, the processor to generate the one or more pixel depth values comprises, for an individual pixel having a missing depth value, the processor to generate a window around a pixel position of the individual pixel in a reference image and to search for a best match window from a plurality of search windows within a target image, wherein the search windows extend only from a first search window positioned greater than a predetermined disparity position from a collocated window in the target image to a last search window at a maximum disparity position from the collocated window, wherein the first search window has a one pixel disparity from the predetermined disparity position.

Further to the second embodiments, the processor to generate the one or more pixel depth values comprises, for an individual pixel having a missing depth value, the processor to generate a window around a pixel position of the individual pixel in a reference image and to search for a best match window from a plurality of search windows within a target image, wherein the search windows extend only from a first search window positioned greater than a predetermined disparity position from a collocated window in the target image to a last search window at a maximum disparity position from the collocated window, wherein the best match window comprises a search window of the search windows having a minimum sum of squared difference that is less than a predetermined threshold.

Further to the second embodiments, the processor to generate the one or more pixel depth values comprises, for an individual pixel having a missing depth value, the processor to generate a window around a pixel position of the individual pixel in a reference image and to search for a best match window from a plurality of search windows within a target image, wherein the search windows extend only from a first search window positioned greater than a predetermined disparity position from a collocated window in the target image to a last search window at a maximum disparity position from the collocated window, wherein the processor to search for the best match comprises the processor to determine a metric for each of the plurality of search windows and wherein the metrics are determined based on an integral image data structure.

Further to the second embodiments, the processor to generate the one or more pixel depth values comprises, for an individual pixel having a missing depth value, the processor to generate a window around a pixel position of the individual pixel in a reference image and to search for a best match window from a plurality of search windows within a target image, wherein the search windows extend only from a first search window positioned greater than a predetermined disparity position from a collocated window in the target image to a last search window at a maximum disparity position from the collocated window, wherein the reference image and the target image comprise infrared images.

Further to the second embodiments, the depth image model comprises depth image data generated based on a three-dimensional model of the scene and the processor to generate the depth image model comprises the processor to estimate a camera pose associated with a first previous depth image and generate the depth image model based on the camera pose and the three-dimensional model of the scene.

Further to the second embodiments, the processor to determine the depth image enhancement indicator comprises the processor to determine whether a difference between a fill rate of the depth image and a fill rate of the depth image model of the scene is greater than a threshold.

Further to the second embodiments, the processor to determine the depth image enhancement indicator comprises the processor to determine a surface of the depth image model is less than a depth threshold from an estimated camera position or compare a fill rate of the depth image to a fill rate threshold.

Further to the second embodiments, the device further comprises an infrared transmitter to illuminate the scene with infrared light, two or more infrared cameras to attain first stereoscopic infrared images of the scene and second stereoscopic infrared images of the scene, a color camera to attain a color image of the scene, and a graphics processor to generate the depth image based at least in part on the first stereoscopic infrared images, wherein the predetermined disparity position comprises a graphics processor based maximum disparity position and wherein the processor to generate the one or more pixel depth values comprises the processor to generate the one or more pixel depth values based on the second stereoscopic infrared images.

In one or more third embodiments, a system for performing stereoscopic imaging comprises means for receiving a depth image based on a scene, means for generating a depth image model of the scene, means for determining a depth image enhancement indicator associated with the depth image based on the depth image and the depth image model of the scene, and means for generating, when the depth image enhancement indicator indicates enhancement, one or more pixel depth values for missing pixel depth values of the depth image to provide an enhanced depth image or means for skipping, when the depth image enhancement indicator indicates no enhancement, depth image enhancement of the depth image.

Further to the third embodiments, the means for generating the one or more pixel depth values comprise, for an individual pixel having a missing depth value, means for generating a window around a pixel position of the individual pixel in a reference image and means for searching for a best match window from a plurality of search windows within a target image, wherein the search windows extend only from a first search window positioned greater than a predetermined disparity position from a collocated window in the target image to a last search window at a maximum disparity position from the collocated window.

Further to the third embodiments, the means for generating the one or more pixel depth values comprise, for an individual pixel having a missing depth value, means for generating a window around a pixel position of the individual pixel in a reference image and means for searching for a best match window from a plurality of search windows within a target image, wherein the search windows extend only from a first search window positioned greater than a predetermined disparity position from a collocated window in the target image to a last search window at a maximum disparity position from the collocated window, wherein the depth image is received from a hardware component and the predetermined disparity position comprises a hardware based maximum disparity position.

Further to the third embodiments, the means for generating the one or more pixel depth values comprise, for an individual pixel having a missing depth value, means for generating a window around a pixel position of the individual pixel in a reference image and means for searching for a best match window from a plurality of search windows within a target image, wherein the search windows extend only from a first search window positioned greater than a predetermined disparity position from a collocated window in the target image to a last search window at a maximum disparity position from the collocated window, wherein the first search window has a one pixel disparity from the predetermined disparity position.

Further to the third embodiments, the means for generating the one or more pixel depth values comprise, for an individual pixel having a missing depth value, means for generating a window around a pixel position of the individual pixel in a reference image and means for searching for a best match window from a plurality of search windows within a target image, wherein the search windows extend only from a first search window positioned greater than a predetermined disparity position from a collocated window in the target image to a last search window at a maximum disparity position from the collocated window, wherein the best match window comprises a search window of the search windows having a minimum sum of squared difference that is less than a predetermined threshold.

Further to the third embodiments, the means for generating the one or more pixel depth values comprise, for an individual pixel having a missing depth value, means for generating a window around a pixel position of the individual pixel in a reference image and means for searching for a best match window from a plurality of search windows within a target image, wherein the search windows extend only from a first search window positioned greater than a predetermined disparity position from a collocated window in the target image to a last search window at a maximum disparity position from the collocated window, wherein the means for searching comprise means for determining a metric for each of the plurality of search windows based on an integral image data structure.

Further to the third embodiments, the means for generating the one or more pixel depth values comprise, for an individual pixel having a missing depth value, means for generating a window around a pixel position of the individual pixel in a reference image and means for searching for a best match window from a plurality of search windows within a target image, wherein the search windows extend only from a first search window positioned greater than a predetermined disparity position from a collocated window in the target image to a last search window at a maximum disparity position from the collocated window, wherein the reference image and the target image comprise infrared images.

Further to the third embodiments, the depth image model comprises depth image data generated based on a three-dimensional model of the scene and the three-dimensional model is based on a sequence of previous depth images all previous to the depth image.

Further to the third embodiments, the depth image model comprises depth image data generated based on a three-dimensional model of the scene and the three-dimensional model is based on a sequence of previous depth images all previous to the depth image, wherein the means for generating the depth image model of the scene comprise means for estimating a camera pose associated with a first previous depth image and means for generating the depth image model based on the camera pose and the three-dimensional model of the scene.

Further to the third embodiments, the means for determining the depth image enhancement indicator comprise means for determining whether a difference between a fill rate of the depth image and a fill rate of the depth image model of the scene is greater than a threshold.

Further to the third embodiments, the means for determining the depth image enhancement indicator comprise at least one of means for determining a surface of the depth image model is less than a depth threshold from an estimated camera position or means for comparing a fill rate of the depth image to a fill rate threshold.

In one or more fourth embodiments, at least one machine readable medium comprises a plurality of instructions that, in response to being executed on a device, cause the device to perform stereoscopic imaging by receiving a depth image based on a scene, generating a depth image model of the scene, determining a depth image enhancement indicator associated with the depth image based on the depth image and the depth image model of the scene, and generating, when the depth image enhancement indicator indicates enhancement, one or more pixel depth values for missing pixel depth values of the depth image to provide an enhanced depth image or skipping, when the depth image enhancement indicator indicates no enhancement, depth image enhancement of the depth image.

Further to the fourth embodiments, generating the one or more pixel depth values comprises, for an individual pixel having a missing depth value, generating a window around a pixel position of the individual pixel in a reference image and searching for a best match window from a plurality of search windows within a target image, wherein the search windows extend only from a first search window positioned greater than a predetermined disparity position from a collocated window in the target image to a last search window at a maximum disparity position from the collocated window.

Further to the fourth embodiments, generating the one or more pixel depth values comprises, for an individual pixel having a missing depth value, generating a window around a pixel position of the individual pixel in a reference image and searching for a best match window from a plurality of search windows within a target image, wherein the search windows extend only from a first search window positioned greater than a predetermined disparity position from a collocated window in the target image to a last search window at a maximum disparity position from the collocated window, wherein the depth image is received from a hardware component, the predetermined disparity position comprises a hardware based maximum disparity position, and the first search window has a one pixel disparity from the hardware based maximum disparity position.

Further to the fourth embodiments, generating the one or more pixel depth values comprises, for an individual pixel having a missing depth value, generating a window around a pixel position of the individual pixel in a reference image and searching for a best match window from a plurality of search windows within a target image, wherein the search windows extend only from a first search window positioned greater than a predetermined disparity position from a collocated window in the target image to a last search window at a maximum disparity position from the collocated window, wherein the best match window comprises a search window of the search windows having a minimum sum of squared difference that is less than a predetermined threshold.

Further to the fourth embodiments, generating the one or more pixel depth values comprises, for an individual pixel having a missing depth value, generating a window around a pixel position of the individual pixel in a reference image and searching for a best match window from a plurality of search windows within a target image, wherein the search windows extend only from a first search window positioned greater than a predetermined disparity position from a collocated window in the target image to a last search window at a maximum disparity position from the collocated window, wherein the searching comprises determining a metric for each of the plurality of search windows and wherein the metrics are determined based on an integral image data structure.

Further to the fourth embodiments, the depth image model comprises depth image data generated based on a three-dimensional model of the scene and generating the depth image model of the scene comprises estimating a camera pose associated with a first previous depth image and generating the depth image model based on the camera pose and the three-dimensional model of the scene.

Further to the fourth embodiments, determining the depth image enhancement indicator comprises determining whether a difference between a fill rate of the depth image and a fill rate of the depth image model of the scene is greater than a threshold.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for performing stereoscopic imaging via a device comprising:
   receiving a depth image based on a scene;
   generating a depth image model of the scene;
   determining a depth image enhancement indicator associated with the depth image based on the depth image and the depth image model of the scene; and
   generating, when the depth image enhancement indicator indicates enhancement, one or more pixel depth values for missing pixel depth values of the depth image to provide an enhanced depth image, wherein generating the one or more pixel depth values comprises, for an individual pixel having a missing depth value:
   generating a window around a pixel position of the individual pixel in a reference image; and
   searching for a best match window from a plurality of search windows within a target image, wherein the search windows extend only from a first search window positioned greater than a predetermined disparity position from a collocated window in the target image to a last search window at a maximum disparity position from the collocated window, or
   skipping, when the depth image enhancement indicator indicates no enhancement, depth image enhancement of the depth image.

2. The method of claim 1, wherein the depth image is received from a hardware component and the predetermined disparity position comprises a hardware based maximum disparity position.

3. The method of claim 1, wherein the first search window has a one pixel disparity from the predetermined disparity position.

4. The method of claim 1, wherein the best match window comprises a search window of the search windows having a minimum sum of squared difference that is less than a predetermined threshold.

5. The method of claim 1, wherein the searching comprises determining a metric for each of the plurality of search windows and wherein the metrics are determined based on an integral image data structure.

6. The method of claim 1, wherein the reference image and the target image comprise infrared images.

7. The method of claim 1, wherein the depth image model comprises depth image data generated based on a three-dimensional model of the scene, wherein the three-dimensional model is based on a sequence of previous depth images all previous to the depth image.

8. The method of claim 7, wherein generating the depth image model of the scene comprises:
   estimating a camera pose associated with a first previous depth image; and
   generating the depth image model based on the camera pose and the three-dimensional model of the scene.

9. The method of claim 1, wherein determining the depth image enhancement indicator comprises at least one of determining whether a difference between a fill rate of the depth image and a fill rate of the depth image model of the scene is greater than a threshold, determining a surface of the depth image model is less than a depth threshold from an estimated camera position, or comparing the fill rate of the depth image to a fill rate threshold.

10. A device comprising:
a memory to store a depth image based on a scene; and
a processor to generate a depth image model of the scene, to determine a depth image enhancement indicator associated with the depth image based on the depth image and the depth image model of the scene, and to generate, when the depth image enhancement indicator indicates enhancement, one or more pixel depth values for missing pixel depth values of the depth image to provide an enhanced depth image or to skip, when the depth image enhancement indicator indicates no enhancement, depth image enhancement of the depth image, wherein the processor to generate the one or more pixel depth values comprises, for an individual pixel having a missing depth value, the processor to generate a window around a pixel position of the individual pixel in a reference image and to search for a best match window from a plurality of search windows within a target image, wherein the search windows extend only from a first search window positioned greater than a predetermined disparity position from a collocated window in the target image to a last search window at a maximum disparity position from the collocated window.

11. The device of claim 10, wherein the best match window comprises a search window of the search windows having a minimum sum of squared difference that is less than a predetermined threshold.

12. The device of claim 10, wherein the processor to search for the best match comprises the processor to determine a metric for each of the plurality of search windows and wherein the metrics are determined based on an integral image data structure.

13. The device of claim 10, wherein the depth image model comprises depth image data generated based on a three-dimensional model of the scene, and wherein the processor to generate the depth image model comprises the processor to estimate a camera pose associated with a first previous depth image and generate the depth image model based on the camera pose and the three-dimensional model of the scene.

14. The device of claim 10, wherein the processor to determine the depth image enhancement indicator comprises at least one the processor to determine whether a difference between a fill rate of the depth image and a fill rate of the depth image model of the scene is greater than a threshold, to determine a surface of the depth image model is less than a depth threshold from an estimated camera position, or to compare the fill rate of the depth image to a fill rate threshold.

15. The device of claim 10, further comprising:
an infrared transmitter to illuminate the scene with infrared light;
two or more infrared cameras to attain first stereoscopic infrared images of the scene and second stereoscopic infrared images of the scene; and
a graphics processor to generate the depth image based at least in part on the first stereoscopic infrared images, wherein the predetermined disparity position comprises a graphics processor based maximum disparity position and wherein the processor to generate the one or more pixel depth values comprises the processor to generate the one or more pixel depth values based on the second stereoscopic infrared images.

16. At least one non-transitory machine readable medium comprising a plurality of instructions that, in response to being executed on a device, cause the device to perform stereoscopic imaging by:
receiving a depth image based on a scene;
generating a depth image model of the scene;
determining a depth image enhancement indicator associated with the depth image based on the depth image and the depth image model of the scene; and
generating, when the depth image enhancement indicator indicates enhancement, one or more pixel depth values for missing pixel depth values of the depth image to provide an enhanced depth image, wherein generating the one or more pixel depth values comprises, for an individual pixel having a missing depth value:
generating a window around a pixel position of the individual pixel in a reference image; and
searching for a best match window from a plurality of search windows within a target image, wherein the search windows extend only from a first search window positioned greater than a predetermined disparity position from a collocated window in the target image to a last search window at a maximum disparity position from the collocated window, or
skipping, when the depth image enhancement indicator indicates no enhancement, depth image enhancement of the depth image.

17. The machine readable medium of claim 16, wherein the depth image is received from a hardware component, the predetermined disparity position comprises a hardware based maximum disparity position, and the first search window has a one pixel disparity from the hardware based maximum disparity position.

18. The machine readable medium of claim 16, wherein the best match window comprises a search window of the search windows having a minimum sum of squared difference that is less than a predetermined threshold.

19. The machine readable medium of claim 16, wherein the searching comprises determining a metric for each of the plurality of search windows and wherein the metrics are determined based on an integral image data structure.

20. The machine readable medium of claim 16, wherein the depth image model comprises depth image data generated based on a three-dimensional model of the scene and generating the depth image model of the scene comprises:
estimating a camera pose associated with a first previous depth image; and
generating the depth image model based on the camera pose and the three-dimensional model of the scene.

21. The machine readable medium of claim 16, wherein determining the depth image enhancement indicator comprises at least one of determining whether a difference between a fill rate of the depth image and a fill rate of the depth image model of the scene is greater than a threshold, determining a surface of the depth image model is less than a depth threshold from an estimated camera position, or comparing the fill rate of the depth image to a fill rate threshold.

22. A device comprising:
an infrared transmitter to illuminate a scene with infrared light;
two or more infrared cameras to attain first stereoscopic infrared images of the scene and second stereoscopic infrared images of the scene;
a color camera to attain a color image of the scene;

a graphics processor to generate a depth image based at least in part on the first stereoscopic infrared images, wherein the graphics processor generates the depth image based on a predetermined disparity position comprising a graphics processor based maximum disparity position;

a memory to store the depth image based on the scene; and a processor to generate a depth image model of the scene, to determine a depth image enhancement indicator associated with the depth image based on the depth image and the depth image model of the scene, and to generate, when the depth image enhancement indicator indicates enhancement, one or more pixel depth values for missing pixel depth values of the depth image based on the second stereoscopic infrared images to provide an enhanced depth image or to skip, when the depth image enhancement indicator indicates no enhancement, depth image enhancement of the depth image.

23. The device of claim 22, wherein the processor to generate the one or more pixel depth values comprises, for an individual pixel having a missing depth value, the processor to generate a window around a pixel position of the individual pixel in a reference image and to search for a best match window from a plurality of search windows within a target image, wherein the search windows extend from a first search window positioned greater than the predetermined disparity position from a collocated window in the target image to a last search window at a maximum disparity position from the collocated window.

24. The device of claim 23, wherein the best match window comprises a search window of the search windows having a minimum sum of squared difference that is less than a predetermined threshold.

25. The device of claim 22, wherein the processor to determine the depth image enhancement indicator comprises at least one of the processor to determine whether a difference between a fill rate of the depth image and a fill rate of the depth image model of the scene is greater than a threshold, to determine a surface of the depth image model is less than a depth threshold from an estimated camera position, or to compare the fill rate of the depth image to a fill rate threshold.

* * * * *